United States Patent
Xu

(10) Patent No.: US 7,652,706 B2
(45) Date of Patent: *Jan. 26, 2010

(54) PIXEL ANALOG-TO-DIGITAL CONVERTER USING A RAMPED TRANSFER GATE CLOCK

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 525 days.

This patent is subject to a terminal disclaimer.

(21) Appl. No.: 11/354,444

(22) Filed: Feb. 15, 2006

(65) Prior Publication Data

US 2007/0188640 A1    Aug. 16, 2007

(51) Int. Cl.
H04N 5/335 (2006.01)
(52) U.S. Cl. ................................. 348/308; 348/294
(58) Field of Classification Search ..... 348/207.99–376
See application file for complete search history.

(56) References Cited

U.S. PATENT DOCUMENTS

| | | | | |
|---|---|---|---|---|
| 6,067,113 | A * | 5/2000 | Hurwitz et al. | 348/241 |
| 6,344,877 | B1 * | 2/2002 | Gowda et al. | 348/245 |
| 6,667,768 | B1 * | 12/2003 | Fossum | 348/308 |
| 6,697,114 | B1 * | 2/2004 | Merrill | 348/308 |
| 6,767,312 | B2 * | 7/2004 | Shim | 438/59 |
| 7,382,008 | B2 * | 6/2008 | Xu | 257/291 |
| 2003/0189657 | A1 | 10/2003 | Hammadou | |
| 2004/0135070 | A1 * | 7/2004 | Cazaux et al. | 250/214.1 |
| 2004/0196397 | A1 * | 10/2004 | Beck et al. | 348/308 |
| 2005/0083421 | A1 | 4/2005 | Berezin et al. | |

OTHER PUBLICATIONS

Kleinfelder et al., A 10,000 Frames/s CMOS Digital Pixel Sensor, *IEEE Journal of Solid-State Circuits*, vol. 36, No. 12, Dec. 2001 (pp. 2049-2059).
Fowler et al., A CMOS Area Image Sensor with Pixel-Level A/D Conversion, *1994 IEEE International Solid-State Circuits Conference*, Paper TP 13.5, pp. 226 and 227.

* cited by examiner

*Primary Examiner*—Tuan Ho
*Assistant Examiner*—Mark Monk
(74) *Attorney, Agent, or Firm*—Peyton C. Watkins; Nancy R. Simon

(57) ABSTRACT

An image sensor includes a photosensitive region that accumulates charge corresponding to received incident light; a transfer gate for transferring charge from the photosensitive region; a voltage supply having an increasing voltage over time; a floating diffusion for receiving the charge from the photosensitive region and converting the charge to a voltage; an amplifier for receiving and amplifying a signal from the floating diffusion; a comparator for comparing a voltage from the amplifier to a reference voltage; and a counter for counting clock cycles between initiation of the increasing voltage until a signal is received from the comparator indicating charge transfer from the photosensitive region to the floating diffusion; wherein a digital signal is generated that represents an unfilled capacity of the photosensitive region.

17 Claims, 5 Drawing Sheets

PIXEL ANALOG-TO-DIGITAL CONVERTER USING A RAMPED TRANSFER GATE CLOCK

FIELD OF THE INVENTION

The invention relates generally to the field of image sensors, and more particularly, to such CMOS image sensors in which the image signal is converted into a digital signal immediately after output from the pixel array.

BACKGROUND OF THE INVENTION

Presently known CMOS image sensors all have the same or substantially the same structures. They typically include the photosensitive devices, like a photodiode or photogate, in the pixel array to convert the optical signal to charge; a floating diffusion capacitor for converting the charge to a voltage; and a pixel amplifier buffering the floating diffusion capacitance from the large output bus capacitance and sending the electrical signal out of the pixel array. The pixel output signals are stored by a sample/hold circuit array followed by an analog signal processing chain and an analog-to-digital converter.

The drawbacks for this present CMOS image sensor is the high noise, low speed and high power. These problems can be addressed by moving the analog-to-digital conversion to earlier stages and then processing the signal in the digital domain. One such prior art for processing in digital domain in an earlier stage is disclosed in IEEE Journal of Solid-State Circuits, Vol. 36, No. 12, December 2001 (page 2049). This prior art includes a ramped voltage applied to a comparator independently of the pixel. This independence can cause pixel-to-pixel non-uniformities at the output.

Consequently, a need exists for addressing the high noise, low speed and high power of the image sensors having the latter stage analog-to-digital conversion circuits and the pixel-to-pixel non-uniformities of the image sensors having earlier stage analog-to-digital conversion circuits. This pixel-to-pixel non-uniformities is addressed in the present invention in which the transfer gate adjacent the photodiode is ramped, and the reference voltage is from the pixel reset.

SUMMARY OF THE INVENTION

The present invention is directed to overcoming one or more of the problems set forth above. Briefly summarized, according to one aspect of the present invention, the invention resides in an image sensor comprising (a) a photosensitive region that accumulates charge corresponding to received incident light; (b) a transfer gate for transferring charge from the photosensitive region; (c) a voltage supply having a ramped voltage over time; (d) a floating diffusion for receiving the charge from the photosensitive region and converting the charge to a voltage; (e) an amplifier for receiving and amplifying a signal from the floating diffusion; (f) a comparator for comparing a voltage from the amplifier to a reference voltage; and (g) a counter for counting clock cycles between initiation of the increasing voltage until a signal is received from the comparator indicating charge transfer from the photosensitive region to the floating diffusion.

The above and other objects of the present invention will become more apparent when taken in conjunction with the following description and drawings wherein identical reference numerals have been used, where possible, to designate identical elements that are common to the figures.

Advantageous Effect Of The Invention

The present invention has the advantage of high-speed processing, lower power dissipation and low noise. It further eliminates the effects of non-linearity and threshold variations in the pixel amplifier.

DETAILED DESCRIPTION OF THE INVENTION

Figure 1:
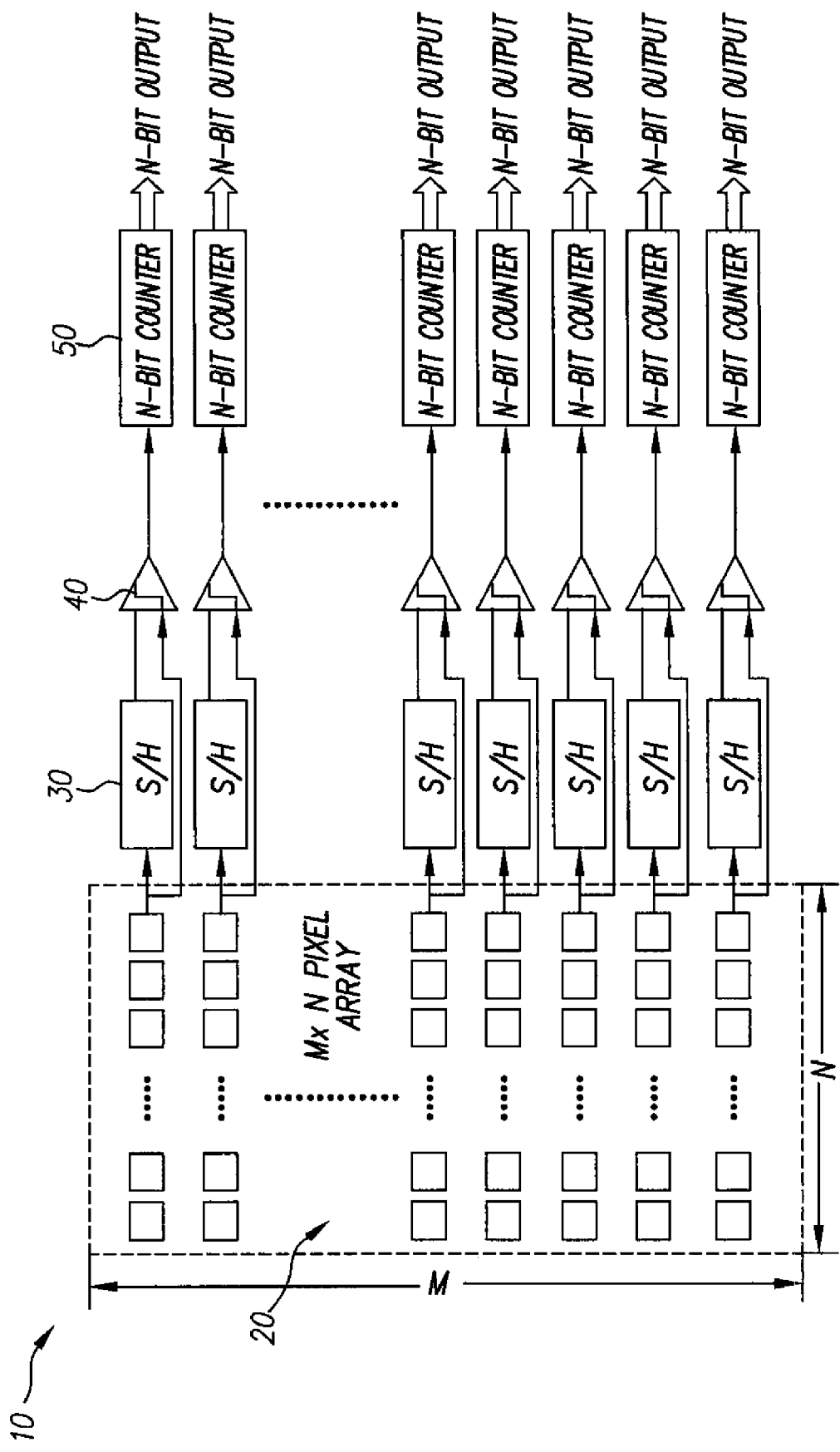
FIG. 1 is a block diagram of the image sensor of the present invention.

Referring to FIG. 1, there is shown a image sensor 10 of the present invention having a plurality of pixels 20 and a plurality of sample and hold circuits 30 for receiving and storing the signals from the plurality of pixels 20 in a predetermined manner. A plurality of comparators 40 are respectively connected to the output of each sample and hold circuit 30, and a plurality of counters 50 are respectively connected to the plurality of comparators 40.

Figure 2:
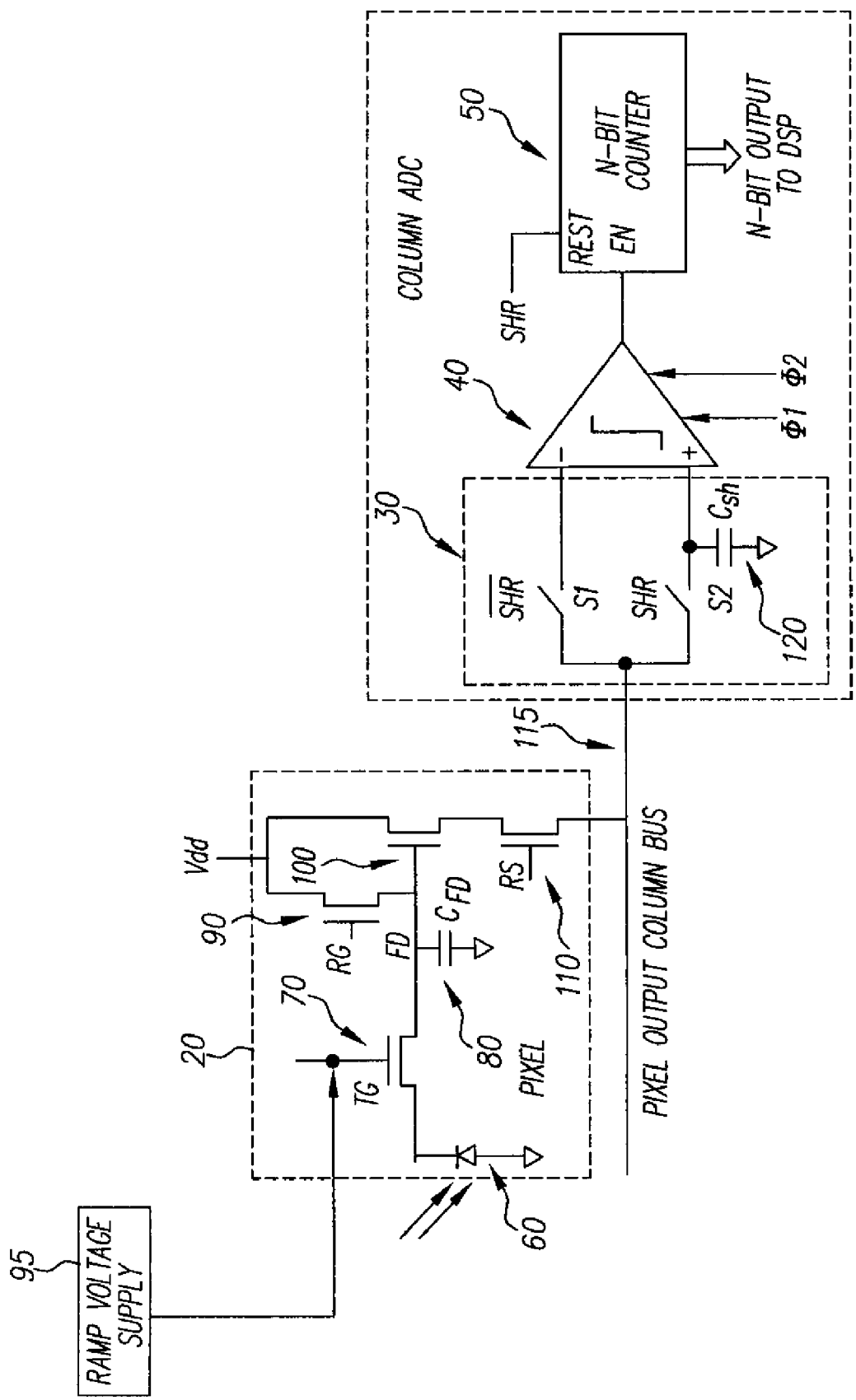
FIG. 2 is a schematic diagram of FIG. 1.

For clarity of understanding, it is noted that the above-described apparatus of the present invention limits the analog circuit usage (for the purpose of noise reduction) and maximally utilizes the advantages of digital circuits. It is also noted that FIG. 2 illustrates only one pixel and its associated circuitry of the present invention for illustrating a representative pixel of the plurality of pixels of the present invention for clarity of understanding. It is understood that the present invention includes a plurality of such pixels; for example, the pixel array 20 as shown in FIG. 1. Referring to FIG. 2, the pixel 20 is composed of a photosensitive region or photodiode 60 that accumulates charge in response to incident light. A transfer gate 70 receives a ramped voltage over time (preferably an increasing voltage over time) from a voltage supply 95 which causes transfer of charge from the photodiode 60 to a charge-to-voltage conversion region or floating diffusion 80, which converts charge to a voltage signal. The increasing voltage is supplied by a voltage supply 95 which is preferably on-chip but outside the pixel array 20. The voltage supply 95 may optionally be located off-chip in an alternative embodiment. A reset transistor 90 sets a reference voltage for both the floating diffusion 80 and the sample and hold circuit 30, which (in the case of the sample and hold circuit 30) will be subsequently used by the comparator 40, as will be described in detail hereinbelow. An amplifier or amplifier transistor 100 receives and amplifies the signal from the floating diffusion 80. A row select transistor 110 selects the particular row of pixels for output to the sample and hold circuit 30.

Figure 3:
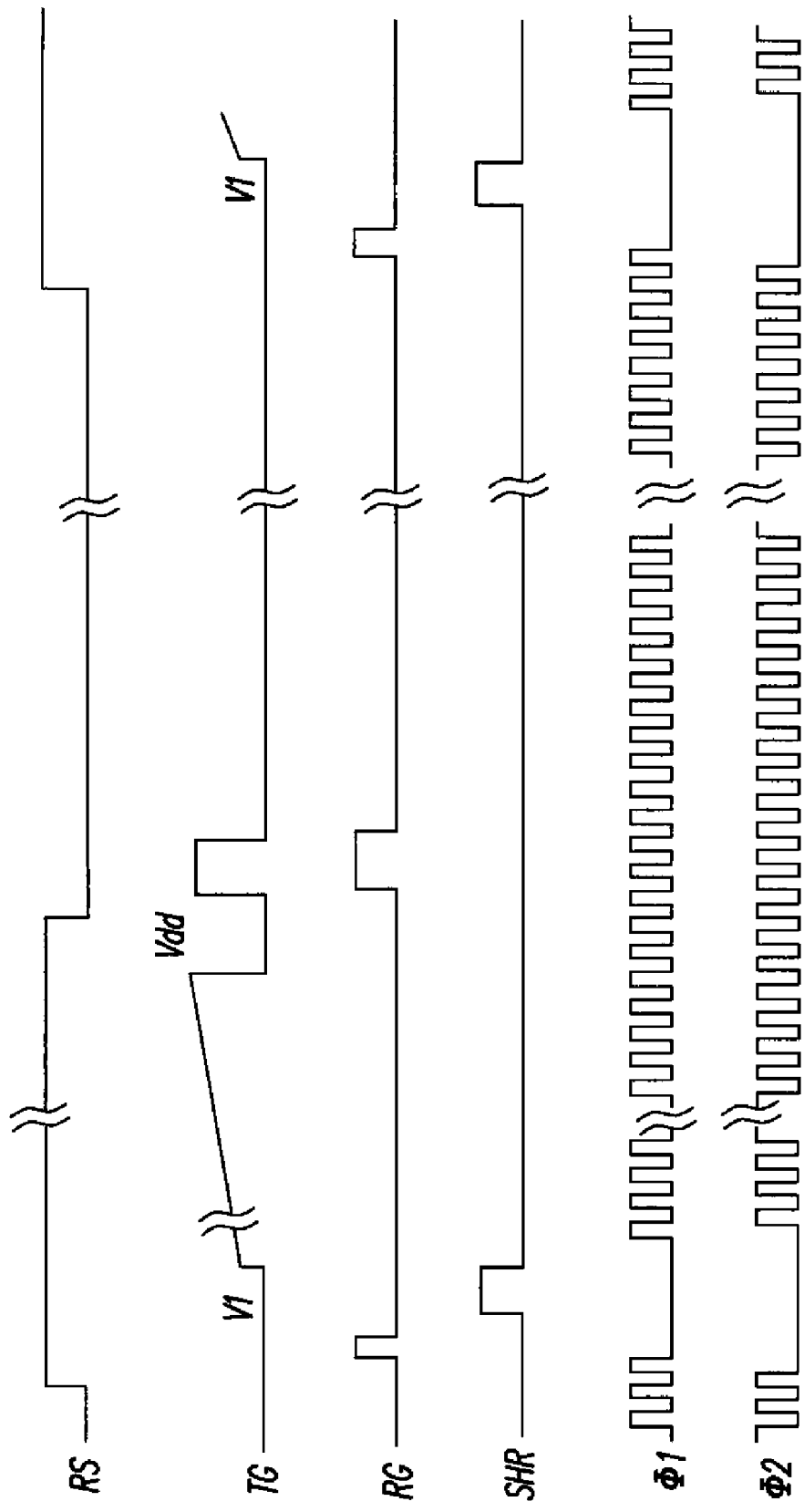
FIG. 3 is a timing diagram for FIG. 2.

FIG. 3 includes the preferred timing for FIG. 2 and includes common timing signal acronyms for the timing signal to be applied to a component referred to in FIG. 2—RS, TG, RG and SHR. Referring now to FIGS. 2 and 3, an image is captured by the plurality of photodiodes 60 during integration, and after integration, a row of pixels in the pixel array is selected for readout by applying a "high" to the gate of row select transistor 110. A pulse voltage is then applied to the gate of the reset transistor 90 to clear charge from the floating diffusion (FD) capacitor 80 and to then reset the floating diffusion 80 to the reference voltage. The voltage at FD 80 is amplified by the amplifier 100 and sent out to the column bus. With the reference signal at the output node 115, clock SHR goes from "low" to "high" to close switch S2 and open switch S1. The reference voltage is sampled onto the capacitor (Csh) 120. The SHR clock also resets the counter 50. Following the SHR pulse, a ramped or an increasing voltage over time is applied onto the transfer gate 70 to create a potential underneath the transfer gate 70 for transferring the signal from the photodiode 60 to the floating diffusion 80. Then SHR changes from high to low, switch S1 closes and S2 opens which puts the comparator 40 in the comparing state, and the counter 50 starts counting clock cycles until the comparator 40 signals the counter 50 to terminate counting. The comparator 50 compares the pixel output voltage to the sampled reset voltage in each column.

When the ramped TG voltage generates a sufficient potential underneath the TG gate 70, charge accumulated in photodiode 60 begins to flow from photodiode 60 to floating diffusion 80. It is noted that the present invention uses the floating diffusion 80 to sense the "beginning" or "initiation" of charge transfer from the photodiode 60, as opposed to sensing the "entire" charge on the photodiode as in the prior art. Returning to the present invention discussion, a voltage change is created at the floating diffusion 80 upon initiation of charge transfer, and the voltage change is sent out through the pixel amplifier 100 to the column comparator 40. This voltage change triggers the comparator 40 to change output states. The "enable" (en) input of the counter 50 senses the change in output from the comparator 40 and then stops counting. The content of the column counter 50 is the raw pixel digital output.

A digital calibration function is included in the A/D conversion operation by sampling incident light in darkness which is stored in memory (on or off-chip). This calibration signal will be subtracted from the digital signal representing the captured image. The pixel noise and pixel amplifier offset are removed or greatly reduced.

Figure 4A:
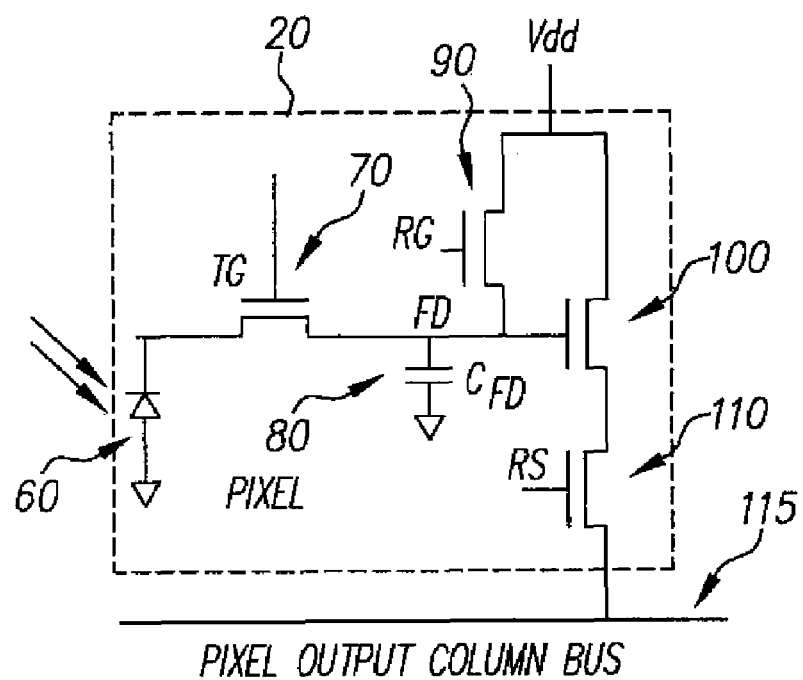
FIG. 4a illustrates the image sensor of the present invention in schematic form.
Figure 4B:
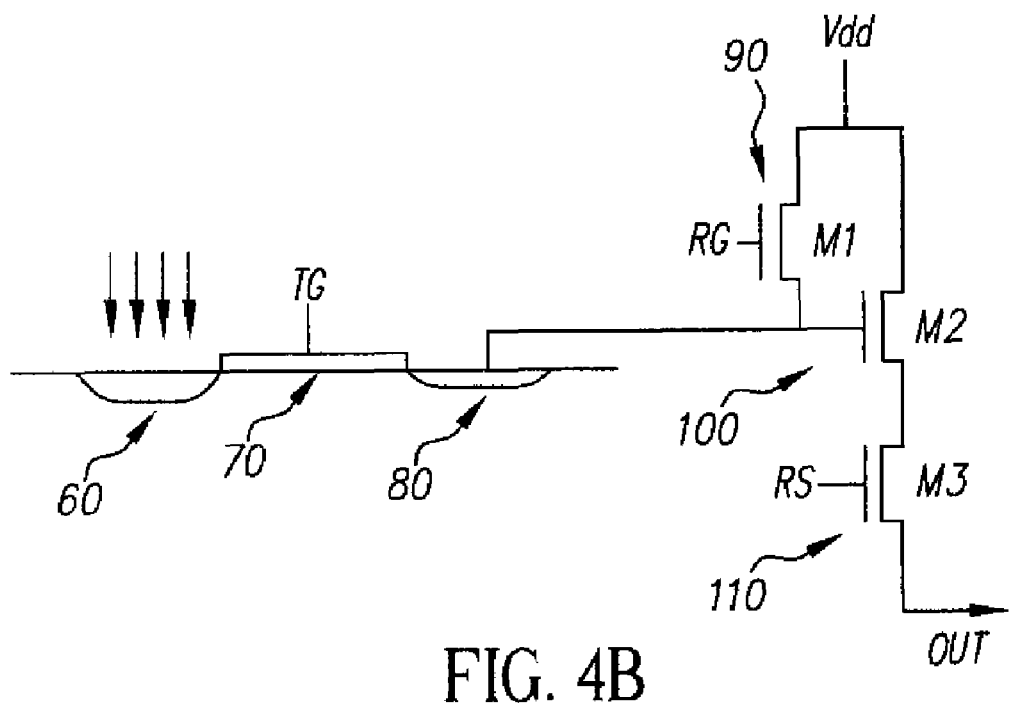
FIG. 4b illustrates a cross section of the present invention.
Figure 4C:
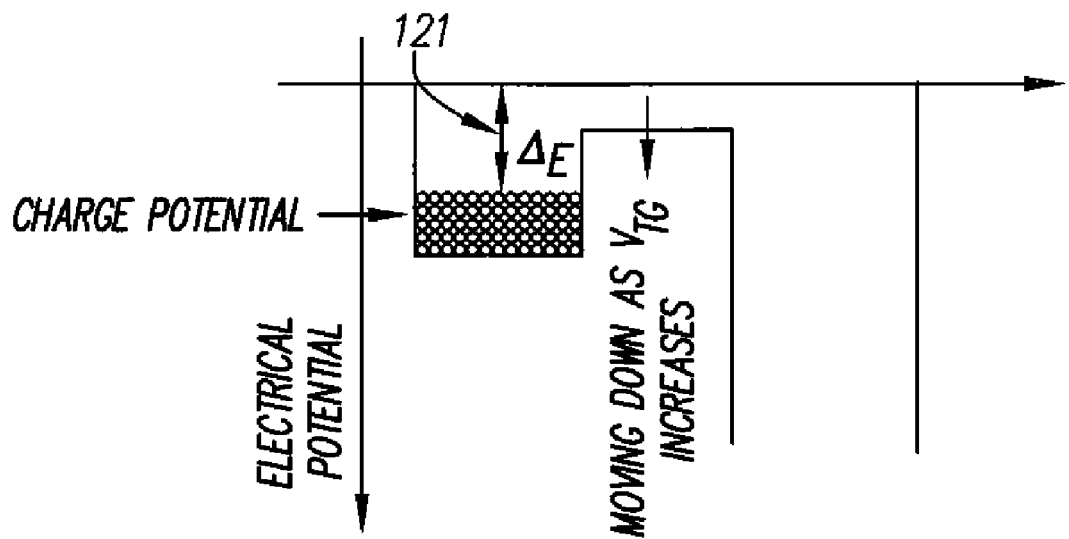
FIG. 4c illustrates a well potential diagram for FIG. 4b for clearly illustrating the concept of the present invention.

Referring to FIGS. 4a-4c, it is noted for clarity that the prior art detects the number of electrons. In contrast, the image sensor of the present invention detects the electrical charge potential of the photodiode, or in other words, it detects the depth of the unfilled potential well of the photodiode. With the presence of the light on the photodiode 60 in the pixel array 20, electrical charges are generated and accumulated in an electrical potential well 121 in the photodiode 60. There is a transfer gate 70 in the pixel in between the photodiode 60 and a floating diffusion 80, which floating diffusion 80 is used to convert the charge to voltage. The voltage applied on the gate of the transfer gate 70 controls the potential underneath the gate and creates a conductive channel when the voltage is higher the threshold voltage of the transfer gate 70. The potential well 121 of the photodiode 60 and the floating diffusion area 80 are connected by this created channel of the transfer gate 70. With the increase of this gate voltage, the electrical potential underneath the gate is lowered. When the potential underneath the transfer gate 70 is equal to the electrical potential of the well 121 of the photodiode 60, charge accumulated in the photodiode 60 starts to move from photodiode 60 to the diffusion area 80 through the transfer gate 70. The move of charge from photodiode 60 to the floating diffusion 80 will generate a voltage signal at the floating diffusion area 80 which is then sent to the input of the pixel amplifier 100. The circuit in the column sample-and-hold array 30 compares the voltage signal at the pixel amplifier output 115 to a previously generated reference voltage when the transfer gate voltage is applied. The move of the electrons from photodiode 60 to the floating diffusion 80 will trigger the comparator 40 in the sample-and-hold circuit 30 to change its output state. This change of comparator 40 output state stops the counter 50 and a digital code is generated at the counter 50 output. This digital code or the digital signal represents the image signal created by the pixel.

Figure 5:
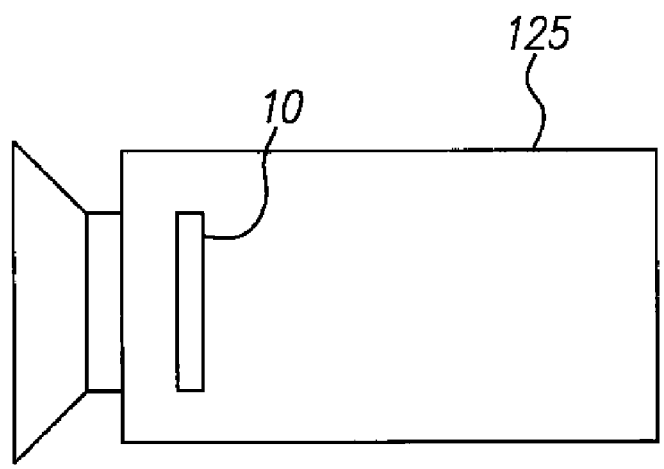
FIG. 5 is a digital camera of the present invention for illustrating a typical commercial embodiment for the image sensor of the present invention.

Referring to FIG. 5, there is shown a digital camera 125 in which the image sensor 10 of the present invention is disposed for illustrating a preferred commercial embodiment of the present invention.

The invention has been described with reference to a preferred embodiment. However, it will be appreciated that variations and modifications can be effected by a person of ordinary skill in the art without departing from the scope of the invention.

PARTS LIST

10 image sensor
20 plurality of pixels
30 sample and hold circuits
40 comparators
50 counters
60 photodiode
70 transfer gate
80 floating diffusion
90 reset transistor
95 voltage supply
100 amplifier transistor
110 row select transistor
115 output node or pixel amplifier output
120 capacitor (Csh)
121 electrical potential well
125 digital camera

The invention claimed is:

1. An image sensor comprising:
   (a) a photosensitive region that accumulates charge corresponding to received incident light;
   (b) a voltage supply having a ramped voltage over time that is applied to a transfer gate;
   (c) a charge-to-voltage conversion region for receiving at least a portion of the charge from the photosensitive region in response to the ramped voltage applied to the transfer gate, wherein the charge-to-voltage conversion region converts the charge to a voltage;
   (d) an amplifier for receiving and amplifying the voltage received from the charge-to-voltage conversion region;
   (e) a comparator for comparing the voltage received from the amplifier to a reference voltage; and
   (f) a counter for counting clock cycles between an initial application of the ramped voltage to the transfer gate and the receipt of a signal from the comparator, wherein the signal from the comparator indicates a voltage change at the charge-to-voltage conversion region indicating an initiation of charge transfer from the photosensitive region to the charge-to-voltage conversion region.

2. The image sensor as in claim 1, wherein the ramped voltage is an increasing voltage over time.

3. The image sensor as in claim 1 further comprising a reset transistor for generating the reference voltage.

4. The image sensor as in claim 1 further comprising a capacitor electrically connected to the comparator for holding the reference voltage.

5. The image sensor as in claim 1, wherein the photosensitive region is a photodiode.

6. The image sensor as in claim 1 further comprising a row select transistor electrically connected to the amplifier for enabling readout.

7. An imaging device comprising:
(a) a photosensitive region that accumulates charge corresponding to received incident light;
(b) a voltage supply having a ramped voltage over time that is applied to a transfer gate;
(c) a charge-to-voltage conversion region for receiving at least a portion of the charge from the photosensitive region in response to the ramped voltage applied to the transfer gate, wherein the charge-to-voltage conversion region converts the charge to a voltage;
(d) an amplifier for receiving and amplifying the voltage received from the charge-to-voltage conversion region;
(e) a comparator for comparing the voltage received from the amplifier to a reference voltage; and
(f) a counter for counting clock cycles between an initial application of the ramped voltage to the transfer gate and the receipt of a signal from the comparator, wherein the signal from the comparator indicates a voltage change at the charge-to-voltage conversion region indicating an initiation of charge transfer from the photosensitive region to the charge-to-voltage conversion region.

8. The imaging device as in claim 7, wherein the ramped voltage is an increasing voltage over time.

9. The imaging device as in claim 7 further comprising a reset transistor for generating the reference voltage.

10. The imaging device as in claim 7 further comprising a capacitor electrically connected to the comparator for holding the reference voltage.

11. The imaging device as in claim 7, wherein the photosensitive region is a photodiode.

12. The imaging device as in claim 7 further comprising a row select transistor electrically connected to the amplifier for enabling readout.

13. A method of operating an image sensor, the method comprising:
accumulating charge corresponding to received incident light by a photosensitive region;
(b) applying a ramped voltage over time to a transfer gate to transfer at least a portion of the charge from the photosensitive region to a charge-to-voltage conversion region;
(c) converting the charge to a voltage;
(d) upon an initial application of the ramped voltage to the transfer gate, beginning a count of clock cycles;
(e) comparing the voltage received from the charge-to-voltage conversion region to a reference voltage to detect a voltage change at the charge-to-voltage conversion region;
(f) upon detection of the voltage change at the charge-to-voltage conversion region, stopping the count of clock cycles; and
(g) outputting a signal representing a number of counted clock cycles.

14. The method as in claim 13 further comprising providing an increasing voltage over time as the ramped voltage.

15. The method as in claim 13 further comprising providing the charge-to-voltage conversion region as a floating diffusion.

16. The method as in claim 13 further comprising providing the photosensitive region as a photodiode.

17. The method as in claim 16 further comprising providing the charge-to-voltage conversion region as a floating diffusion.

* * * * *